United States Patent [19]

Macmillan

[11] Patent Number: 4,952,118

[45] Date of Patent: Aug. 28, 1990

[54] SYSTEM AND APPARATUS FOR STORAGE OF WHEELED TRAILER FRAMES IN HORIZONTAL STACKS

[75] Inventor: Robert N. Macmillan, Roselle, N.J.

[73] Assignee: RNMAC Services Inc., Roselle, N.J.

[21] Appl. No.: 242,048

[22] Filed: Sep. 8, 1988

[51] Int. Cl.$^5$ .................................................. B65G 1/00
[52] U.S. Cl. ................................ 414/788.2; 414/791.2;
414/791.5; 414/281; 414/620; 414/621;
414/626; 414/912; 410/31; 410/33; 211/13;
294/67.33; 294/81.54
[58] Field of Search ............... 414/281, 560, 561, 607,
414/620, 621, 626, 912, 788.2, 791.2, 791.5,
792.9; 410/5, 6, 31, 32, 33, 34, 35, 36, 37, 38, 39,
40, 41, 42, 43, 44, 45, 46, 47, 48; 211/13;
294/81.54, 81.62, 67.33

[56] References Cited

U.S. PATENT DOCUMENTS

| | | | |
|---|---|---|---|
| 2,283,309 | 5/1942 | Bean et al. ............................. | 410/33 |
| 2,755,949 | 7/1956 | Schenkelberger .................... | 414/620 |
| 4,427,117 | 1/1984 | Matthewson et al. ................ | 211/13 |
| 4,437,807 | 3/1984 | Perrott ................................. | 414/620 |
| 4,493,421 | 1/1985 | Matthewson et al. ................ | 211/13 |
| 4,549,663 | 10/1985 | Corbett, Jr. et al. ............. | 410/31 X |
| 4,583,902 | 4/1986 | Riley .................................. | 414/620 X |
| 4,600,350 | 7/1986 | Matthewson et al. .......... | 414/620 X |
| 4,611,962 | 9/1986 | Braly et al. ........................ | 410/31 X |
| 4,664,576 | 5/1987 | Coe .................................... | 414/620 X |
| 4,749,328 | 6/1988 | Lanigan, Jr. et al. .......... | 414/626 X |
| 4,826,384 | 5/1989 | Okura et al. ...................... | 410/31 X |
| 4,838,754 | 6/1989 | Beliles et al. ....................... | 414/607 |

FOREIGN PATENT DOCUMENTS 0009258 1/1977 Japan ................................ 294/67.33

*Primary Examiner*—H. Grant Skaggs
*Assistant Examiner*—Boris Milef
*Attorney, Agent, or Firm*—Davis, Hoxie, Faithfull & Hapgood

[57] ABSTRACT

A storage system for wheeled trailer frames includes a staircase-like support rack. Frames are stacked horizontally with their front ends supported by the rack and with their rear wheels nested. Trailer frames are lifted and stacked by means of a traveling overhead yard crane provided with a lifting attachment or by means of a forklift truck provided with a lifting attachment slidingly engaged by its tines.

61 Claims, 4 Drawing Sheets

SYSTEM AND APPARATUS FOR STORAGE OF WHEELED TRAILER FRAMES IN HORIZONTAL STACKS

BACKGROUND OF THE INVENTION

This invention relates to the storage of wheeled trailer frames of the type used to haul cargo containers over the road.

Wheeled trailer frames, often referred to as "chassis," must be stored at ship or rail loading sites. They may, of course, be stored in their normal horizontal position by lowering their front vertically adjustable jacks or "landing gear." Such storage consumes a large amount of critical space at a loading site. It also leaves the chassis vulnerable to unauthorized removal.

Attempts have been made to solve the problems of chassis storage by means of systems and apparatus for swinging chassis into a vertical position and retrievably storing them in specially designed storage racks. Apparatus by which a tractor or forklift truck can be used to flip a chassis into vertical position and transport it to a storage facility are described in Riley U.S. Pat. No. 4,583,902, entitled Method and System for Storing Wheeled Frames of Detachable Cargo Container Type Trailers, and Perrott U.S. Pat. No. 4,437,807, entitled Wheeled Trailer Frame Carrying Unit Attachment for Lift Truck. Storage racks for vertically oriented chassis are described in Riley U.S. Pat. No. 4,583,902 and in Corbett et al. U.S. Pat. No. 4,549,663, entitled Storage System for Trailer Frames. While the apparatus and systems disclosed in the above Riley, Perrott and Corbett et al. patents offer improvements over individual chassis storage, they suffer from serious drawbacks and disadvantages.

Taking first the chassis flipping method and apparatus, Perrott U.S. Pat. No. 4,437,807 discloses a carriage 30 which is mounted on the mast of a forklift truck in place of the fork. This is a rather permanent attachment, which is an immediate drawback. The carriage supports an elongated boom 32 of I-beams 34, which in turn supports a movable carriage carrying hydraulically operated horizontal clamps and vertical clamps to engage the side rails of the chassis. The boom also has carrier support pads 98 to engage the rear bolster of the chassis. The combined weight of the flipping apparatus and the chassis results in a large moment about the mast. The forklift size and capacity, and the mast itself must be capable of withstanding the large moment at the start of flipping, and a large counterweight on the forklift generally will be required. In addition, experience with flipping apparatus of the type described has resulted in a high incidence of damage to tail lights, stop lights and marker lights positioned along the rear bolster of the chassis.

To engage a chassis the flipping truck approaches it from the rear. As it does so, the boom must align with the longitudinal centerline of the chassis. According to Perrott U.S. Pat. No. 4,437,807, either the lift truck must be capable of moving its mast laterally (there are available attachments for lift trucks known as "side shifters"), or else the lift truck operator must reposition his vehicle to line up with the longitudinal centerline of the chassis. Obviously, expense is involved no matter which course is followed. Riley U.S. Pat. No. 4,583,902 discloses a side shifter arrangement for a mounting frame attachment for a tractor, that shifter comprising a transversely movable carriage which can be shifted by a pair of hydraulic cylinders 72. This increases the cost and complexity of the flipping apparatus and adds weight to the forward section of the boom.

Turning to the vertical storage rack, additional drawbacks are seen. Riley discloses a storage rack arrangement having a central channel for storing a row of vertically oriented chassis, and side channels for retractable gate mechanisms to hold each chassis. The rack is an open beam structure, roughly U-shaped, with vertical support beams which appear to be about half the length of a chassis—and chassis are typically 23 feet and 40 feet in length. Corbett et al. U.S. Pat. No. 4,549,663 discloses a tree-like storage rack having a central open-beam support structure from which retractable arms extend outwardly on both sides to support vertically oriented chassis. The Corbett et al. structure appears to be about three quarters as high as a chassis is long, or about 18 feet high. The structure is said to be supported by suitable anchoring means such as base members 12' and 14'.

A commercial rack of the Corbett et al. type has retractable arms located approximately 17 feet above ground level. The arrangement has serious drawbacks. For example, to withstand the moment applied to the arms, the rack is heavy. A rack which can hold 18 chassis weights about 17,000 lbs., or nearly 1000 lbs. per chassis. The rack must be anchored to the ground by means of large subsurface foundations or above-ground counterweights. If designed to withstand winds of 80 mph impinging on a fully loaded rack from the side, each vertical post must withstand a moment of 300,000 ft-lbs.

The racks of both Riley and Corbett et al. are rather complex in design, with retractable gates or arms. They must be fabricated in a variety of different-sized parts, including certain heavy pieces, and erected on site. The Corbett et al. rack additionally requires a previously prepared subsurface foundation, as described above. The racks are complex, heavy, and expensive, and are not easy to assemble or relocate. On the other hand, vertical storage racks of Corbett et al. do significantly save ground space for storing chassis as compared to a parking lot, reducing the amount of land consumed by about 75-80% (depending on arrangement) for 23-ft. chassis and by 85-89% for 40-ft. chassis. It will be readily appreciated why there is greater savings through vertical storage of longer chassis as compared to shorter chassis.

SUMMARY OF THE INVENTION

It is the overall object of this invention to reduce or eliminate the drawbacks of the vertical chassis storage systems described above while retaining the very high land-use savings of the better of those systems. Thus, the objects of this invention are to reduce the weight, cost, complexity and assembly difficulties of the vertical storage racks, and to improve relocatability. Also, the objects are to reduce the cost and complexity of the storing vehicle and to eliminate damage to auxiliary equipment and appurtenances of chassis.

According to this invention, there is provided a system and apparatus for storing wheeled trailer frames, or chassis, in a stacked horizontal arrangement in a nested manner. The tandem rear wheels of stacked chassis are nested and support approximately two-thirds of the weight of the stack.

A low-cost, lightweight multi-tiered rack is provided to support the forward ends of the nested chassis. The rack has numerous advantages compared to the vertical storage racks described above. It has no moving parts. It can be constructed of inexpensive and commonly available materials. Preferably, it can be constructed almost entirely from a few sizes of metal pipe or tubing and angle-iron bracing. It can be nearly completely prefabricated, with minimal on-site assembly requiring neither special equipment nor prepared subsurface foundation. The rack can be relocated easily. And having no moving parts, it is virtually maintenance free.

Chassis lifting and transporting are accomplished by available yard equipment. Chassis support attachments are provided for overhead-type yard cranes or for vehicles mounting vertically movable carriages such as forklift trucks, top loaders and side loaders. The attachments permit a crane or vehicle to grip a chassis only about its waist, which is typically free of auxiliary equipment and appurtenances, thus avoiding damage to the chassis. The attachments need not provide for flipping chassis on end and so are simpler, lighter and less expensive than those for vertical storage.

Attachments for cranes can be designed so that they can be stowed within the crane when not in use. The attachment for a forklift truck can be designed so that it can be slipped onto and off of the tines of the truck, which enables the truck to be quickly and easily converted to other use. Thus, equipment normally on hand at a container shipping site can be used conveniently to store and retrieve chassis on a part-time basis.

Hand-in-hand with the many advantages of the system of this invention is a very economical use of land space. Typical arrangements show approximately the same land area savings (86–89%, depending on arrangement) as the Corbett et al. vertical storage system for 40-ft. chassis and higher land area savings (84–87%, depending on arrangement) than the Corbett et al. vertical storage system for 23-ft. chassis. Thus, the many advantages of the system of this invention are attained without significant diminution of land area savings and in some cases even a modest improvement in savings.

BRIEF DESCRIPTION OF THE DRAWINGS

FIG. 3 is a side elevation showing an overhead yard crane spreader having a chassis lifting attachment in place for lifting and transporting a chassis.

FIG. 4 is a side elevation of a chassis lifting attachment for a truss-type spreader frame for an overhead yard crane.

FIG. 5 is a fragmentary section of the lifting attachment shown in FIG. 4, taken along line A—A in FIG. 4, and depicting stowage of the lifting hooks.

DESCRIPTION OF THE PREFERRED EMBODIMENT

Figure 1:
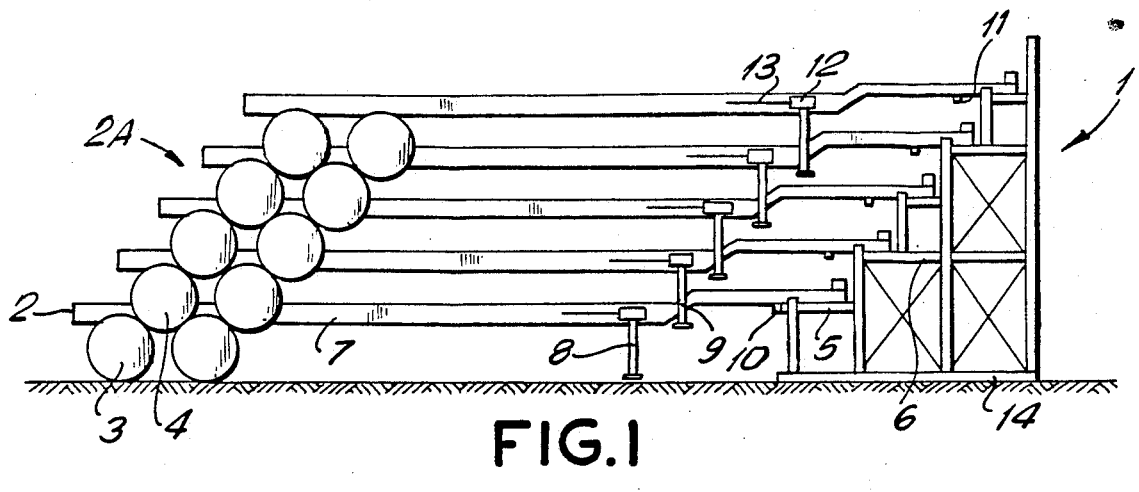
FIG. 1 is a side elevation of a stack of nested chassis stored according to this invention with their front ends supported by a support rack according to this invention.
Figure 2:
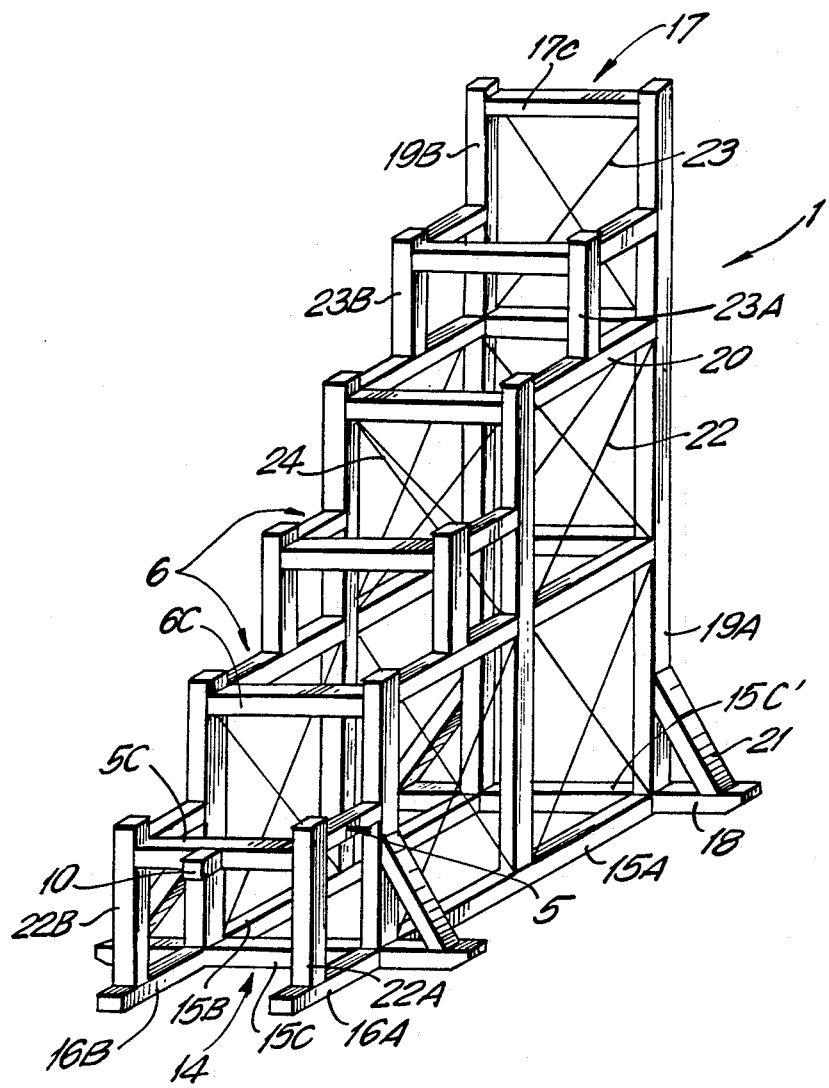
FIG. 2 is a perspective view of a support rack according to a preferred embodiment of this invention designed to accommodate a nested stack of six 40-ft. chassis.

FIGS. 1 and 2 illustrate a typical chassis support rack 1 according to this invention. FIG. 1 shows the support rack designed to support up to six chassis stacked horizontally with their tandem rear wheels in a nested arrangement. In FIG. 1 a stack 2A of five nested chassis 2 are shown stacked on support rack 1. The support rack 1 and the rear wheels of the bottommost chassis 2 rest on the ground. The chassis are said to be nested, because the wheels 4 of the second chassis are displaced forwardly from and nest with wheels 3 of the bottom chassis, and so on as one moves up the stack. In this application I refer to that arrangement as "nesting."

Each chassis 2 is a typical wheeled trailer frame for cargo containers. It comprises a pair of parallel side rails 7, which normally are I beams. The rear ends of the side rails 7 are supported by a tandem set of rear wheels 3. The opposite or front ends are supported during travel by a tractor.

Typical wheeled trailer frames are of two types: a 23-ft. type and a 40-ft. type. They differ not only in length, but also in their side rails. The side rails of the 23-ft. type are straight from the rear end to the front end. For typical 40-ft. chassis, however, the side rails have a 6-inch step toward the front end, as is shown in FIG. 1. As will be explained, that difference results in the rise of the bottom, or first, step of a rack for 40-ft. trailer frames to be six inches greater than the rise of the bottom step of a rack for 23-ft. trailer frames.

Toward the front end of the chassis and mounted outboard of the side rails 7 are vertically adjustable legs, sometimes referred to as "landing gear," e.g., 8, 9. The landing gear are attached to side rails 7 at their top ends by means of a support box 12 and are supported in part by longitudinal struts 13, extending from the landing gear inwardly and rearwardly to the side rails. The landing gear are retracted where a chassis is being hauled over the road by a tractor but are cranked down to support the front end of the chassis when it is removed from the tractor.

Separation of the side rails (outside measurement) is about 40 inches. Bolsters 80, 81 (FIG. 10) are placed across the rails at the rear and toward or at the front of the chassis to provide stable support for 8-ft. wide containers.

The first level 5 of support rack 1 supports the forward end of the bottom chassis 2 in a generally horizontal attitude. The next level 6 of support rack 1 supports the second chassis 2 also in a generally horizontal attitude, and so on. Each level of support rack 1 is displaced horizontally from the next lower level, e.g., level 6 is displaced horizontally from level 5, which permits each chassis to be lifted vertically with no interference from support rack 1.

Nested stacking as shown in FIG. 1 permits the bottom chassis 2 to be stored with its vertically adjustable jack or "landing gear" 8 in an extended position. Because of the forward horizontal displacement of succeedingly higher chassis comprising the stack 2A, the landing gear of all the chassis can be extended during storage. Referring to the second chassis 2, its landing gear 9 actually extend below the longitudinal side rails 7 of the bottom chassis. Stacking of chassis with their landing gear extended saves having to stow the landing gear during storage and to crank the landing gear down as a chassis is retrieved from storage. The forward horizontal displacement of chassis in the stack 2A permits the landing gear of all the chassis 2 to hang free of the next lower chassis, thereby avoiding damage to the landing gear as well.

The center of gravity of a chassis is typically not more than one third of its length from the rear. Thus, the nested wheels carry more than two-thirds of the weight of stack 2A, and chassis support rack 1 need carry less than about one-third of the weight of stack 2A. This permits chassis support rack 1 to be of lightweight construction. Further, because that weight which support rack 1 must carry is spread over the base of the rack, no foundation or special bearing surface is required.

As was stated earlier, the vertical storage rack of the Corbett et al. type requires large subsurface foundations or heavy above-ground counterweights to withstand side wind loads. The system of this invention alleviates that need in three ways: first, rack 1 has a rectangular base which can be provided with laterally extending feet for sideways stability; second, each chassis 2 imparts in the neighborhood of 1800 pounds of downward force to rack 1; and third, two or more of racks 1 can be placed side by side and tied together with cross bars to effectively broaden the base to provide additional resistance to wind loads.

Nesting, which involves a forward displacement of successive levels of chassis 2 in stack 2A, imposes a horizontal component of force on the bottommost chassis 2, which would tend to push that chassis backwards away from support rack 1. To guard against slippage, particularly if the brakes of the bottommost chassis 2 are not engaged for any reason, the first level 5 of the support rack is provided with a collar 10 to receive the kingpin 11 of the bottommost chassis 2. Other safety means to prevent rearward slippage could be used, for example, chocks behind the wheels 3 of the bottommost chassis 2. Because the nesting of the wheels naturally chocks the wheels of the second and each higher chassis in stack 2A, it is not necessary to catch the kingpins of those chassis.

FIG. 2 is a perspective view of a preferred embodiment of a support rack according to this invention, shown for a six-high stack of chassis. As can be seen from FIG. 2, rack 1 is an open rectangular staircase structure having a bottom "level" or "step" 5, four intermediate steps or levels 6, and a top step or level 17, including respectively cross members or "rungs" 5C, 6C and 17C which support the front ends of side rails 7 of a stack 2A of six chassis 2.

The steps are constructed without any interfering overhang. Referring to FIG. 1, it can be seen that each chassis 2 can be lifted vertically without interference from any part of the rack. Whether using a crane or a forklift truck to retrieve chassis, it is required that each chassis can be lifted vertically without interference so as to clear the next lower chassis in the stack.

The embodiment shown in FIG. 2 is designed to be constructed almost entirely from three sizes of round pipe or most preferably, rectangular tubing (3 in. × 3 in., 3.5 in. × 3.5 in., and 4 in. × 4 in.) and one size of angle iron (1.5 in. × 1.5 in.). Because support rack 1 can be lightweight, the metal thickness of the tubing and the angle iron is only 3/16-inch. Because it has no moving parts, rust is not a significant problem, and rack 1 can be constructed of ordinary steel. If desired, rack 1 can be painted. To eliminate all maintenance, the rack could be constructed from corrosion-resistant metal. It will be appreciated, of course, that one has a wide latitude both in specific design of the rack and the materials used.

Rack 1 comprises a base structure 14 of the 4 in. × 4 in. tubing. Base 14 comprises parallel side members 15A, 15B and cross members 15C, 15C'. The inside width of base 14, equal to the length of cross members 15C, 15C', is greater than 40-inch outside measurement across side rails 7. I have chosen to make the base cross members 15C, 15C' of 4 ft. in length. That sets the length of cross members or rungs 5C, 6C and 17C also at 4 ft.

Also comprising part of base 14 are extensions 16A, 16B for side members 15A, 15B and support feet 18. These have been added as separate pieces for reasons of transportability, as will be explained below. Including these extensions and feet, the maximum dimensions of the base are 2.5 ft. by 8.8 ft.

Vertical members, e.g., 19A, 22A are all constructed of the next largest pipe (3.5 in. × 3.5 in.), as are horizontal members, such as 20 which support a vertical member. The remaining horizontal members, e.g., 5C. 6C, 17C, are constructed of the smallest pipe (3 in. × 3 in.), as are the braces 21 for feet 18. Collar 10 for the first level 5 of the rack is a short piece of 5 in. × 5 in. × 3/16 in. rectangular pipe.

From FIG. 2 it will be understood that each chassis-supporting cross member or rung 5C, 6C, 17C is supported by a pair of vertical members, e.g., 22A/22B, 23A/23B, and 19A/19B which are in the plane of one of the base sides 15A, 15B (including extensions 16A, 16B) and supported by that side either directly or indirectly. Thus, rack 1 comprises a series of horizontally separated inverted U-shaped sections, e.g., 22A/5C/22B, 19A/17C/19B. The difference in height of one section to the next, e.g., 5C to 6C is the vertical rise of a step, e.g., first intermediate step 6. The horizontal separation between adjacent inverted U-shaped sections, centerline to centerline, is the longitudinal depth of a step or level.

The vertical rise and longitudinal depth of the first level of the rack for a 40-ft. chassis are different from those for a 23-ft. chassis. For 40-ft. chassis, the vertical rise of first step or level 5 of rack 1 is 4 ft., and the longitudinal depth most preferred is about 3.8 ft. The longitudinal depth of 3.8 ft. permits attachment of a collar 10 directly to rung 5C. The longitudinal depth could be lessened, but then collar 10 would be extended from rung 5C. For 23-ft. chassis, the comparative vertical rise is about 3.5 ft. and the longitudinal depth would be about 2.1 ft. The vertical rise for steps of all the higher levels is the same for 40-ft. chassis and for 23-ft. chassis, namely, about 2.8 ft. the horizontal depth of all intermediate steps 6 is about 2.1 ft. for 40-ft. chassis and 23-ft. chassis. In the embodiment shown in FIG. 2, the sixth chassis would simply overhang rung 17C.

Angle iron 22 is crisscrossed at the sides, as shown. Angle iron 23 is crisscrossed between the rear vertical members as shown. Angle iron 24 is crisscrossed between intermediate vertical members, also as shown.

For lateral restraint to prevent chassis 2 from slipping off the rack, the vertical members of each inverted U preferably extend above the rung of the U. Referring to the bottom step of rack 1 shown in FIG. 7, it will be seen that vertical supports 22A, 22B extend above cross member 5C and serve as means to retain side rails 7 on the cross member. It is preferred that the vertical supports extend above the cross members by at least one-half inch and most preferably by 2-6 inches.

Rack 1 can be almost entirely prefabricated and trucked to the site at which it is to be used. It may be convenient or necessary, however, to prefabricate the core of the structure and add certain exterior pieces in the field. In the specific embodiment shown in FIG. 2, for example, feet 18 can be left off one side of base 14 to bring the overall width below 8 ft. for transport over the road. Those feet and their braces 21 can readily be added at the site. Similarly, the structural members which comprise first step 5 can readily be added at the site.

As indicated previously, chassis support rack 1 can be designed to accommodate a varying number of chassis. The design shown in FIG. 2 can readily be adapted for stack heights of 2 or more chassis, most preferably 6-10. Eight chassis can be accommodated simply by lengthening the base sides 15A, 15B by 4.3 ft., adding at their ends two more vertical members about 5.5 ft. longer than members 19A, 19B which support step 17, and filling in the "steps" for levels 7 and 8 and adding bracing according to FIG. 2.

It will be appreciated that rack 1 shown in FIG. 2, being narrow, rigid, lightweight and not fragile, can easily be relocated from one location to another.

Figure 10:
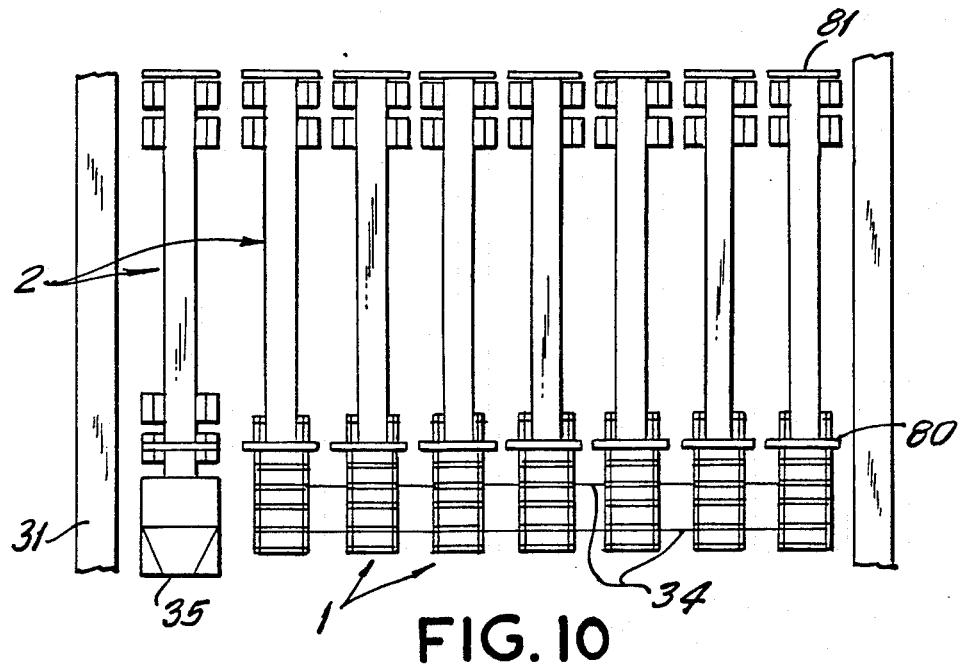
FIG. 10 is a plan view of a storage layout which can be used in conjunction with a typical travelling overhead yard crane.
Figure 11:
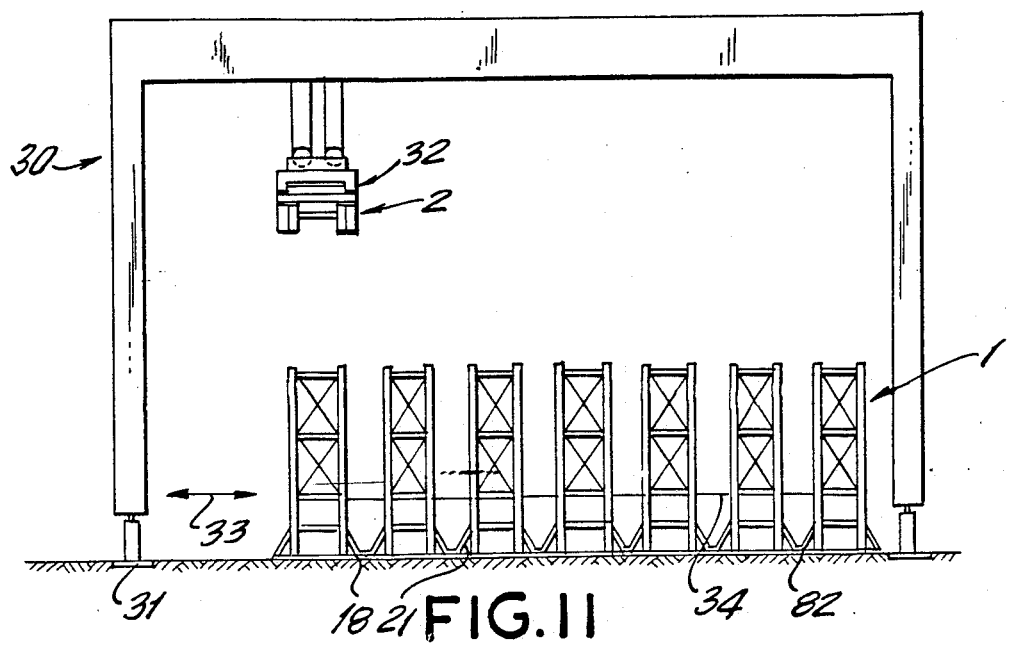
FIG. 11 is an end elevation of the storage layout shown in FIG. 10.

FIGS. 10 and 11 illustrate a typical layout for a group of seven stacks 2A of chassis 2 serviced by a travelling crane having a common width of 80 ft. FIG. 11 shows travelling overhead yard crane 30 on its runway 31. Suspended from crane 30 is its spreader 32, which is carrying a chassis 2. Beneath the crane and to one side has been left clear a traffic aisle 33 approximately 13 ft. wide. To the right of the traffic aisle is a row of seven chassis support racks 1 of the type described earlier in conjunction with FIGS. 1 and 2. Feet 18 and braces 21 of the racks are shown in FIG. 11.

In order to insure proper spacing and to provide stability from horizontal forces, such as impact and wind loads, adjacent racks are tied together in two ways. First, the bases are joined, in this embodiment by cross pieces 82 (FIG. 11) of angle iron, which are added across opposing feet 18 of adjacent racks. Additionally, cross bars 34 of the same tubing used to construct rack 1 are added to connect adjacent racks at at least one and preferably at at least two horizontally spaced higher points more than three feet above ground level. As shown in FIG. 10, two cross bars 34 of tubing have been added between each pair of adjacent racks.

FIG. 10 shows a plan view of the layout. For clarity, travelling overhead crane 30 is not shown in FIG. 10. There is shown in FIG. 10, however, a tractor 35 pulling a chassis 2 in traffic aisle 33. Also shown in FIG. 10 is one chassis 2 on the first level of each of the seven chassis support racks 1. For clarity no additional chassis are shown on the support racks.

A layout such as that shown in FIGS. 10, 11 can be more compact if the width of each rack 1 is limited. Referring to FIG. 10, the maximum width of each chassis 2, as determined by bolsters 80, 81 is 8 ft. Each rack 1 has a maximum width of 8.8 ft., measured across feet 18. This permits racks 1 to be lined up with some clearance between their opposing feet 18 while maintaining a minimal working clearance between bolsters of adjacent chassis 2.

By means of a layout such as that shown in FIGS. 10 and 11, considerable space saving is achieved. As compared to a parking lot arrangement, stacking chassis six high yields a savings of 86% for 40 ft. chassis and 84% for 23 ft. chassis. Increasing the stack height to eight high increases the savings to 89% and 87%, respectively.

The chassis storage system illustrated in FIGS. 10 and 11 is laid out so that it can operate with a spreader 32 of a travelling overhead yard crane 30 serving as the means for lifting, stowing and retrieving chassis. FIG. 3 shows in schematic form a typical box-type spreader 32 and how it is desired to grip the side rails 7 of a chassis 2 to lift the chassis. Spreader 32 is suspended by a group of lifting cables 36 and positioned by a crane trolley (not shown), all of which are under the control of the crane operator in the trolley cab (not shown). The attaching and lifting devices are activated through control cable 37. Spreader 32 includes a frame 38 and retractable arms 39 which attach to the corner castings of containers which the spreader is designed to handle. For the spreader to lift chassis as shown, one or more pairs of opposed L-shaped lifting hooks 40 can be suspended from the spreader frame 38 so that the spreader may grasp the chassis rails 7. The pairs of hooks 40 can be made to engage or disengage the rails 7 by the crane operator. It is preferred that lifting hooks 40 hold the rails relatively snugly to the spreader frame 38. This allows the lifting hooks, even if only one pair is used, to engage a chassis 2 at a convenient longitudinal location without being precisely at its center of gravity.

As the spreader is lifted, chassis 2 will tend to tilt slightly from horizontal, if hooks 40 are not precisely at the center of gravity. Tilting will be minimized, and the basically horizontal attitude of the chassis will be maintained, however, by the abutment of side rails 7 against spreader frame 38. Via cables 36, the crane operator can then tilt spreader 32 to level chassis 2, if necessary for additional attitude control of the chassis.

Figure 6:
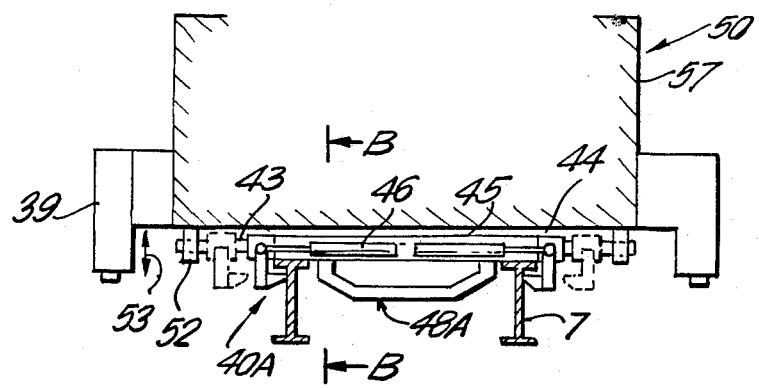
FIG. 6 is a side elevation of a chassis lifting attachment for a box-type spreader frame for an overhead yard crane.
Figure 7:
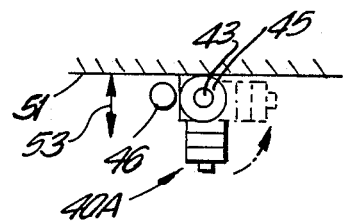
FIG. 7 is a fragmentary system of the lifting attachment shown in FIG. 6, taken along line B—B in FIG. 6, and depicting stowage of the lifting hooks.

Side rails 7 are typically I-beam structures, as shown, for example, in FIG. 4. The I-beam shape presents two undersurfaces that can be engaged by L-shaped hooks 40, namely, the bottom surface of the cap of the I and the underside of the bottom cross member of the I. For lifting with either a crane or a forklift, hooks 40 can be designed to engage either undersurface merely by changing the size of the hooks. To illustrate, both approaches are shown in the drawings. FIGS. 4 and 5 show long hooks, whereas FIGS. 6 and 7 show short hooks.

FIGS. 4-7 show chassis lifting attachments for two types of yard crane spreader frames, truss-type and box-type. FIG. 4 shows in fragmentary elevation a truss-type spreader frame 41 having parallel side members 42 with a chassis lifting attachment and a pair of lifting hooks 40 for engaging chassis side rails 7, shown in cross section as viewed from end-to-end. Extending between and fixed to opposing sides 42, shown in cross section, of truss frame 41 is a support shaft 43 which, with the equipment it carries, comprises a chassis support means. The chassis support means can be fixedly mounted to frame 41, either permanently, as by welding, or detachably, as by bolts or quick release clamps.

Slidably mounted on support shaft 43 by means of sleeves 44 are L-shaped lifting hooks 40. Centered on support shaft 43 is another sleeve 45, which carries hydraulic cylinders 46, which include shafts 47 which are connected to sleeves 44. By means of hydraulic pressure applied to cylinders 46, lifting hooks 40 can be drawn together to a closed position engaging side rails 7, as shown in solid lines in FIG. 4, or opened, as shown in dotted lines. It is advantageous to provide a centering guide for lifting hooks 40. Shown in FIG. 4 is a U-shaped centering guide 48 which projects downwardly from sleeve 45 and which slides readily between rails 7. It is preferred that both lifting hooks 40 open and close, particularly if a centering guide is used, although it is only necessary that one hook move.

The chassis lifting attachment shown in FIG. 4 can be stowed in the truss-type spreader frame 41 when not in use. This is an advantage in that the crane can be very quickly and easily converted back and forth between containers and chassis. FIG. 5 shows a preferred embodiment of the stowage arrangement. FIG. 5 is a view taken along line A—A of FIG. 4. It shows truss frame side 42 which supports the end of support shaft 43. Sleeves 44 and 45 being rotatably mounted on shaft 43, lifting hooks 40 and centering guide 48 (not shown) can all be swung upward, as shown by the dotted arrow, to a stowed position parallel to side 42, as shown by the dotted lines. Means well known to equipment designers can be used to hold the lift hooks and centering guide in their stowed position. For example, a latch (not shown) can be mounted on truss side 42 to engage lifting hooks 40 to hold hooks 40 and in their rotated and stowed position.

FIG. 6 shows in fragmentary elevation a box-type spreader frame with a chassis lifting attachment comprising a pair of short L-shaped lifting hooks 40A for engaging chassis side rails 7, shown in cross section as viewed from end-to-end. Spreader frame 50 comprises a rectangular box 57 and spreader arms 39 which project below the bottom of box 57 by a distance 53. Suspended below box 57 by means of support brackets 52, and rotatably mounted therein, is a support shaft 43, as described in conjunction with FIG. 4. Sleeves 44 and 45 and hydraulic cylinders 46 are the same as the similarly numbered components of FIG. 4 and will not be described again.

It will be noted that the lifting hooks 40A and centering guide 48A shown in FIG. 6 are much shorter than lifting hooks 40 and centering guide 48 shown in FIG. 4. This illustrates the option of lifting side rails 7 by the undersides of their caps or top cross members as well as by the undersides of their bottom cross members. The latter is recommended, however, where stowage space is not a problem.

FIG. 7 illustrates stowage of the chassis lifting attachment when it is not in use. FIG. 7 is a view taken along line B—B of FIG. 6. Lifting hooks 40A and centering guide 48A (shown in FIG. 6) swing upward to a horizontal latched position as shown by the dotted arrow and lines. In the stowed position, they do not project downwardly from box 57 by more than the distance 53. Any convenient latch mechanism may be used, although it is preferred that the latching mechanism require positive action rather than be a friction-type latch.

In a typical operation at a container loading and unloading facility, an overhead yard crane removes containers from their chassis and stacks them up to five tiers high in rows within the width of the crane span. The chassis are then driven to a storage or staging area to await further use. The embodiment of this invention described above provides a convenient alternative and conservation of yard space in that the stacking plan for chassis (FIG. 10) closely matches the typical stacking plan for containers. Because the yard crane can be used to handle both the containers and the chassis, the chassis can be stored in the same area as the containers they bring to the site, and they can be stored during the same operation, if desired.

The horizontal chassis storage system of this invention is not limited to use of the overhead yard crane. Chassis may be lifted, moved, stored and retrieved also by means of a vehicle with lifting capability, such as a forklift truck.

Figure 8:
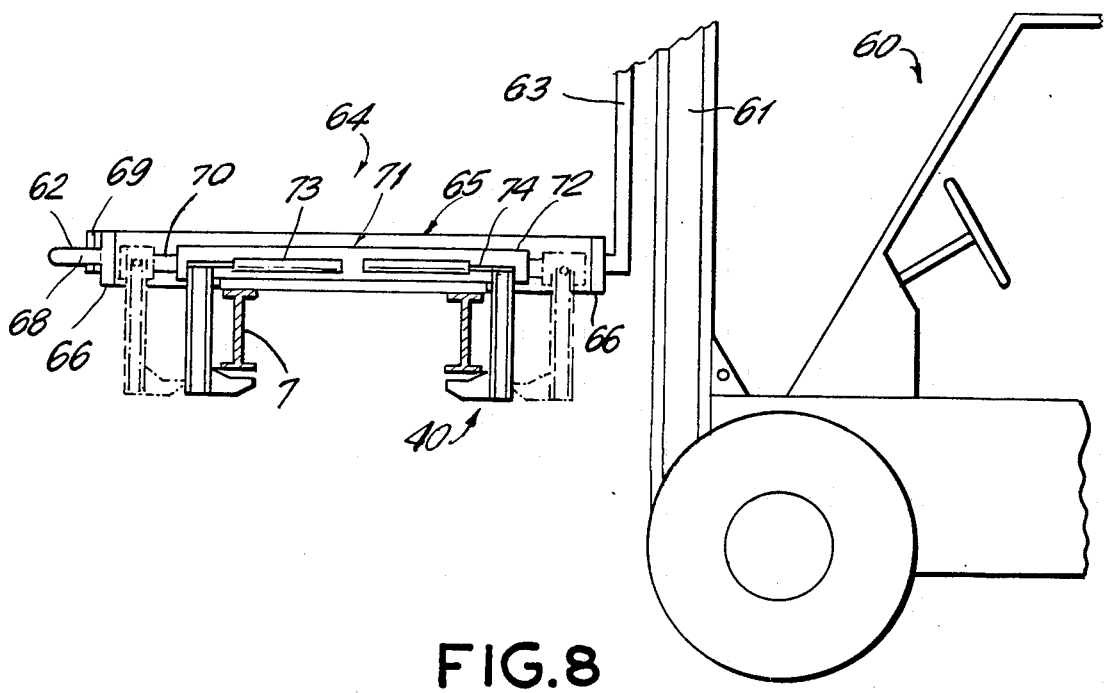
FIG. 8 is a side elevation of a chassis lifting attachment for a forklift truck.
Figure 9:
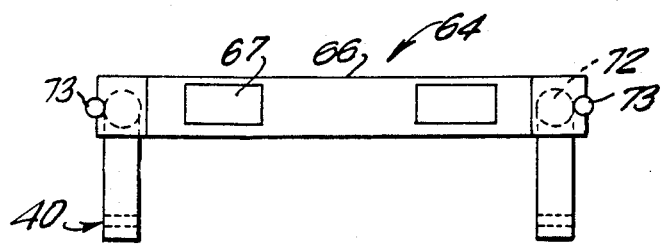
FIG. 9 is a front elevation of the attachment shown in FIG. 8.

FIGS. 8 and 9 show a quick-release chassis lifting attachment for a forklift truck. The attachment fits onto the fork tines of the truck rather than comprising a replacement for the fork or its carriage. It has the further advantage of being slidably engagable by the fork tines, so that the forklift operator can quickly and easily convert his truck to a chassis lifter. And it has a retaining feature of a quick release type for additional time savings.

Turning first to FIG. 8, there is shown in partial side elevation a forklift truck 60 having a mast 61, a fork carriage 63 and fork tines 62. The forklift truck is a well known piece of equipment and so neither it nor its operation need be described here. Suffice to note that carriage 63 and tines 62 are elevatable by the truck operator in the normal manner. Mounted on tines 62 is chassis lifting attachment 64, comprising a rectangular metal frame having sides 65 and front and rear cross members 66. Referring to FIG. 9, a front elevation of attachment 64, there is shown a particular means by which the tines may slidingly engage and lift the frame. That means is a pair of slots 67 which are made in front and rear cross members 66. To pick up the attachment, the operator of a forklift truck need only run fork tines 62 through both pairs of slots 67. Alternatively, for example, U-shaped brackets could be welded onto the tops of cross members 66 to permit sliding engagement and lifting of the frame.

To eliminate the possibility that attachment 64, or part of it, might slide off the tines when not intended to do so, it is preferred to provide releasable retaining means to prevent the tines from slipping out of the attachment. A very simple means is to drill a hole 68 through each tine and to secure the frame onto the tines by means of retaining pins and bolts 69 detachably mounted on tines 62 through hole 68.

Welded to each frame side 65 is a sleeve 71 which slidingly carries a pair of shafts 70. A pair of opposing lifting hooks 40 are carried by each shaft 70 and operated from an open position (dotted lines) to a lifting position (solid lines) in the manner previously described for lifting hooks 40 of FIG. 4. Slidably mounted on shafts 70 by means of sleeves 72 are chassis lifting hooks 40. Long hooks are shown, but short hooks as shown in FIG. 6 could be used. Mounted on sleeve 71 are a pair of hydraulic cylinders 73, which include shafts 74 drivingly connected to sleeves 72. Attachment 64 is placed onto a trailer frame with sides 65 across side rails 7, as is shown in FIG. 8. By means of hydraulic pressure applied to cylinders 73, lifting hooks 40 can be drawn together to engage chassis side rails 7 as shown by the solid lines of FIG. 8, or opened, as shown in dotted lines. In this embodiment, as shown in FIG. 8, the lifting surfaces of hooks 40 are ramped to snug rails 7 up against attachment 64 to minimize wobbling of a chassis 2 during transport by a forklift truck.

Chassis lifting attachment 64 can be stored, for example on the ground, by simply resting it on lifting hooks 40. Alternatively, attachment 64 could be constructed similarly to the spreader frame attachment shown in FIG. 4 so that lifting hooks 40 may be stowed within frame 65, 66 in the same manner as previously described in conjunction with FIG. 5. In that embodiment a single shaft 70 is rotatably mounted between cross members 66 below tines 68 inboard of side 65 for each pair of lifting hooks.

The arrangement shown, including two pairs of lifting hooks 40 mounted outboard of tines 62 provides stability for maintaining a chassis in a basically horizontal attitude during transport and does not require that the chassis be engaged precisely at its center of gravity. Alternatively, but less preferred, a single pair of lifting hooks could be mounted between tines 62. In that case, frame 65, 66 should be wider than is shown in FIG. 9, to provide stability in the manner of a crane spreader, as discussed above in connection with FIG. 3. Two spaced-apart pairs of lifting hooks providing horizontal attitude control, as shown in FIGS. 8, 9, could also be used with spreader frame attachments (FIGS. 3–7). However, I prefer to use only one pair of lifting hooks in those embodiments.

Referring to FIG. 1, a forklift truck approaches a stack 2A of chassis from the side to deposit or retrieve a chassis. To provide flexibility of operation, it may be desirable to utilize a different layout than is shown in FIGS. 10, 11. A flexible layout utilizes rows comprising pairs of racks 1, cross supported as discussed, with an aisle between each pair and an aisle on each end of the row. With that layout a forklift can address each stack of chassis at all times.

The horizontal chassis storage system of this invention has numerous benefits over vertical chassis storage systems. The chassis support rack has no moving parts, is lightweight, easy and relatively inexpensive to construct, and easy to transport. The vertical storage racks, both center aisle type as disclosed in Riley U.S. Pat. No. 4,583,902, and center support type, as disclosed in Corbett et al. U.S. Pat. No. 4,549,663, have retractable moving parts high off the ground to support the various chassis being stored. This complicates construction, adds cost, and will require maintenance of the rack itself.

A vertical storage rack the type disclosed in Corbett et al. U.S. Pat. No. 4,549,663 and capable of supporting eighteen chassis (nine per side) weighs about 17,000 lbs. The horizontal rack shown in FIG. 1, which holds six chassis in a horizontal attitude, weighs only about 2,000 lbs., roughly one-third as much per chassis stored. The horizontal racks of this invention can be placed directly on the ground and do not require either a subsurface foundation or heavy above-ground counter weights. The lightweight racks can be shipped by truck in nearly completed form, which means that they can be almost entirely prefabricated, which offers significant cost savings.

The storage racks according to this invention can be arrayed in a variety of patterns to conform to loading-/unloading yard requirements and configurations. They offer the alternative of being used in conjunction with the same overhead yard crane already in place to handle containers that the chassis bring to and remove from the yard. When so used, chassis and containers can be stored conveniently in the same area serviced by the same yard crane. Chassis can be stacked eight, or even more, high, depending on the working height of the crane.

When used with an overhead yard crane, a chassis lifting attachment according to this invention can be stowable in or on the yard crane spreader, so that the attachment can be left on the spreader even while the crane is loading or unloading containers. This affords a savings of time and manpower, and thus cost.

Whether used with the overhead yard crane or used with a lifting vehicle, such as a forklift truck, the chassis lifting attachment according to this invention is much simpler and lighter than the vehicle attachments of Perrott U.S. Pat. No. 4,437,807 and Riley U.S. Pat. No. 4,583,902. The horizontal stacking system of this invention permits grasping of chassis at a convenient location across the rails of the main frame, with no contact at the rear bolster, which typically contains easily damageable lights and other appurtenances.

Because there is no need to flip chassis to a vertical position the lifting adaptor can be relatively lightweight, simple and inexpensive. Also, the lifting adaptor for a forklift truck can be easily slipped onto and removed from the tines of the forklift, with no need to replace the fork with a special carriage. The combined forklift truck and lifting adapter need not have a sideways shifter on either component, because alignment to a chassis is not nearly as critical as with a flipping attachment.

It will be apparent to those skilled in the art that various changes may be made in the shape, size, type, number and arrangement of parts described above without departing from the spirit of this invention.

I claim:

1. A horizontal storage system for wheeled trailer frames of the detachable cargo container type, each of said trailer frames having a tandem set of rear wheels, longitudinally extending side rails having at least one downward facing surface and a front end, said storage system comprising:
   a. an overhead yard crane comprising a spreader,
   b. trailer frame holding means on the spreader arranged to releasably clamp and support a trailer frame thereto, including at least one pair of opposed side-rail engaging and supporting clamp jaw members at least one of which is movable toward and away from the other, and
   c. at least one multi-level storage rack means for removably receiving from above and for supporting the front ends of a plurality of trailer frames stacked horizontally one upon another in at least one stack with their tandem sets of rear wheels in nested relationship.

2. A system according to claim 1 wherein said trailer frame holding means is stowable in the spreader.

3. A system according to claim 1 wherein said trailer frame holding means additionally includes a centering guide intermediate said opposed side-rail engaging clamp jaw members.

4. A system according to claim 3 wherein opposed members of said at least one pair of opposed clamp jaw members are movable toward and away from each other.

5. A system according to claim 1 wherein said trailer frame holding means is detachably mounted on said spreader.

6. A system according to claim 1 wherein said side rails have a height and wherein each of said side-rail engaging clamp jaw members is L-shaped, having a downwardly extending leg longer than the height of said side rails, carrying an horizontally projecting side-rail supporting leg that closely underlies the lowermost downward facing surface of one of said side rails when at least one clamp jaw member is moved toward the other.

7. A system according to claim 1 additionally comprising means to prevent trailer frames supported by said rack means from moving rearwardly away from said rack means.

8. A system according to claim 7 wherein said plurality of trailer frames stacked horizontally includes a bottommost trailer frame having a kingpin, and wherein said means to prevent frames from moving rearwardly comprises bottommost trailer frame kingpin retaining means attached to said rack means.

9. A system according to claim 1 wherein said multi-level storage rack means comprises a flight of six to ten steps, each step being capable of receiving from above and supporting the front end of one of six to ten of said plurality of trailer frames stacked horizontally.

10. A system according to claim 9 wherein said at least one storage rack means comprises a plurality of storage racks having steps about 3.5–4.5 feet wide and wherein each of said plurality of storage racks is less than 10 feet in maximum width.

11. A system according to claim 10 wherein said plurality of storage racks is at least two storage racks tied together for stability.

12. A system according to claim 9 wherein each of said steps additionally comprises retaining means to prevent a trailer frame from slipping sideways off of said rack means.

13. A system according to claim 9 wherein the opposed members of said at least one pair of opposed clamp jaw members are movable toward and away from each other.

14. A system according to claim 13 wherein said trailer frame holding means additionally includes a centering guide intermediate said opposed side-rail engaging clamp jaw members.

15. A system according to claim 13 wherein said at least one pair of clamp jaw members consists of one pair of said clamp jaw members.

16. A horizontal storage system for wheeled trailer frames of the detachable cargo container type, said trailer frames having a tandem set of rear wheels, longitudinally extending side rails having at least one downward facing surface and a front end, said storage system comprising:
  a. trailer frame lifting and transporting means,
  b. a trailer frame support liftable by said lifting and transporting means, said support comprising
    (i) releasable trailer side-rail clamping and support means, and
    (ii) trailer horizontal attitude control means, and
  c. at least one storage rack comprising a flight of from two to ten steps, each step capable of receiving from above and capable of supporting the front end of one trailer frame in a series of trailer frames stacked horizontally one upon another in at least one stack with their tandem sets of rear wheels in nested arrangement.

17. A system according to claim 16, wherein said lifting and transporting means comprises a crane having a spreader frame and wherein said attitude control means comprises spaced apart sides of said spreader frame.

18. A system according to claim 17, wherein said trailer frame support is fixedly mounted on said spreader frame, and wherein said trailer frame support is stowable in said spreader frame.

19. A system according to claim 16 additionally comprising means to prevent trailer frames supported by said storage rack from moving rearwardly away from said rack.

20. A system according to claim 19 wherein said plurality of trailer frames stacked horizontally includes a bottommost trailer frame having a kingpin, and wherein said means to prevent frames from moving rearwardly comprises bottommost trailer frame kingpin retaining means attached to said rack.

21. A system according to claim 20 wherein said at least one storage rack is at least two storage racks tied together for stability.

22. A system according to claim 21 wherein said storage racks have steps about 3.5–4.5 feet wide and wherein each rack is less than 10 feet in maximum width.

23. A system according to claim 21 wherein each of said steps additionally comprises retaining means to prevent a trailer frame from slipping sideways off of said rack.

24. A system according to claim 16 wherein said trailer frame lifting and transporting means comprises a mobile vehicle mounting a vertically movable carriage.

25. A system according to claim 24 wherein said mobile vehicle is a forklift truck.

26. A system according to claim 25 wherein said vertically movable carriage comprises a pair of tines, wherein said trailer frame support comprises means to slidingly engage said tines, and wherein said releasable trailer side-rail clamping and support means and said trailer horizontal attitude control means comprise two spaced apart pairs of opposed side-rail engaging clamp jaw members at least one of each pair being movable toward and away from the other.

27. A system according to claim 26 wherein said opposed side-rail engaging clamp jaw members, when at least one is moved toward the other, closely underlie the lowermost downward facing surface of said longitudinally extending side rails.

28. A system according to claim 26 additionally comprising releasable retaining means for preventing said trailer frame support from slipping off of said tines.

29. A system according to claim 26 additionally comprising means to prevent trailer frames supported by said storage rack from moving away from said rack.

30. A system according to claim 26 wherein said trailer frame support comprises a rectangular metal frame comprising side members and end members, wherein said means to slidingly engage said tines comprises slots in said side members, and wherein said horizontal attitude control means additionally comprises said end members.

31. A system according to claim 30 wherein said side-rail engaging clamp jaw members are ramped.

32. A system according to claim 24 additionally comprising means to prevent trailer frames supported by said storage rack from moving away from said rack.

33. A system according to claim 32 wherein said plurality of trailer frames stacked horizontally includes a bottommost trailer frame having a kingpin, and wherein said means to prevent frames from moving rearwardly comprises bottommost trailer frame kingpin retaining means attached to said rack.

34. A system according to claim 24 wherein said at least one storage rack is at least two storage racks tied together for stability.

35. For lifting and transporting a wheeled trailer frame of the detachable cargo container type having a pair of longitudinally extending side rails, each characterized by a bottom surface and a height, by means of a forklift truck comprising a pair of tines, a lifting attachment comprising:
   a. an horizontal rectangular metal frame comprising front and rear cross members, each having a pair of slots to slidingly receive said tines, and two side members placeable across said rails;
   b. horizontally mounted on each side member, a pair of coaxial shafts translatable toward one another to a closed position and away from one another to an open position;
   c. hydraulic means for translating each said pair of shafts between said closed and open positions;
   d. suspended from each pair of shafts a pair of opposed side-rail engaging and supporting L-shaped clamp jaw members, each having a vertical leg extending downwardly below said side member by more than the height of said rails, carrying an horizontally projecting side-rail supporting leg, whereby, when the frame side members are placed across said rails, said supporting legs closely underlie the bottom surfaces of said rails when said shafts are in the closed position but do not underlie the bottom surfaces of said rails when said shafts are in the open position.

36. A lifting attachment according to claim 35 wherein said pair of slots comprise slots in said cross members.

37. A lifting attachment according to claim 35 wherein each side-rail supporting leg is ramped to snug the rails against said side members when said shafts are in the closed position.

38. For lifting and transporting a wheeled trailer frame of the detachable cargo container type having a pair of longitudinally extending side rails having at least one downward facing surface by means of an overhead yard crane comprising a spreader frame having opposing side members, a lifting attachment comprising:
   a. at least one clamp jaw support means supported by said spreader frame and extending horizontally between said opposing side members;
   b. slidingly supported by each of said clamp jaw support means, a pair of opposed L-shaped clamp jaw members, at least one of said members being translatable toward the other to a closed position and away from the other to an open position for releasably clamping between them the side rails of said wheeled trailer frame, each L-shaped clamp jaw member having a horizontally extending section which, in said closed position, closely underlies a downward facing surface of one of said side rails; and
   c. a centering guide supported by said at least one clamp jaw support means intermediate said clamp jaw members.

39. A lifting attachment according to claim 38 wherein said at least one claim jaw support means is a single support means located in the middle of said spreader frame.

40. A lifting attachment according to claim 39 wherein each of said clamp jaw members is power operated and movable toward and away from the other.

41. A lifting attachment according to claim 38 wherein said clamp jaw members and said centering guide are rotatable about 90 degrees to a stowed position.

42. A lifting attachment according to claim 38 wherein the side rails are I-beams having a lower downward facing surface and a height and wherein each said L-shaped clamp jaw member has a downwardly extending leg longer than the height of said side rials, said leg carrying said horizontally extending section, and wherein the horizontally extending surface of each clamp jaw member, in said closed position, closely underlies said lower downward facing surface.

43. A lifting attachment according to claim 42 wherein said clamp jaw members are rotatable about 90 degrees to a stowed position.

44. For supporting the front ends of a stack comprising a first, a second and 2–8 additional wheeled trailer frames of the detachable cargo type, said frames comprising longitudinally extending parallel side rails having front ends and rear ends, said rails defining an overall rail width W, and a set of tandem rear wheels proximate the rear ends of said rails, and wherein said frames are stacked horizontally with their tandem rear wheels nested, a support rack comprising:
   a. a base comprising two parallel side members which define an inside width W' and an outside width W", and which define a base plane of said rack,
   b. a three-dimensional framework extending upwardly from said base comprising a series of horizontally separated inverted U-shaped sections forming a series of ascending steps including a bottom step, a first intermediate step, 1–7 succeeding intermediate steps and a top step, each inverted U-shaped section comprising two vertical support members supported by said base side members and having top ends, and a trailer-frame supporting horizontal cross member approximately of length W' joining said vertical support members proximate their top ends, wherein:
   (i) the horizontal cross member of said bottom step is set at a first height above said base plane such that said horizontal cross member of said bottom step will support in a generally horizontal attitude the side rails of said first trailer frame with its rear wheels resting on said plane,
   (ii) the height of the horizontal cross member of said first intermediate step above the horizontal cross member of said bottom step is set at a second height so as to support in a generally horizontal attitude the side rails of said second trailer frame stacked horizontally atop said first trailer frame with rear wheels nested,
   (iii) the height of the horizontal cross member of each succeeding intermediate step and said top step above the horizontal of the immediately proceeding lower step is equal to said second height,
   (iv) the horizontal separation between intermediate U-shaped sections equals the horizontal displacement between nested wheels of two horizontally stacked trailer frames, and
   (v) W" is less than nine feet and W' is greater than W.

45. A support rack according to claim 44, wherein said vertical support members of said U-shaped sections extend above said horizontal cross members by an amount between about one-half inch and six inches.

46. A support rack according to claim 44, wherein the vertical support members of at least every other U-shaped section are supported directly by said parallel side members.

47. A support rack according to claim 44 wherein the members of said base and said three-dimensional framework comprise interconnected sections of pipe.

48. A support rack according to claim 47 wherein said pipe is rectangular in cross section.

49. A support rack according to claim 47 wherein said wheeled trailer frames each additionally comprises a kingpin and wherein said lowest step additionally comprises kingpin catchment means to slidably receive the kingpin of the bottom frame of said stack.

50. A support rack according to claim 44 additionally comprising support feet extending outwardly from said base normal to said parallel side members.

51. A support rack according to claim 44 wherein W' is approximately four feet, wherein said second height is 2.8 feet and wherein the horizontal separation between intermediate U-shaped sections is about 2.1 feet.

52. A support rack according to claim 44 wherein said first height is about 3.5 ft. and said second height is about 2.8 ft.

53. A support rack according to claim 44 wherein said first height is about 4.0 ft. and said second height is about 2.8 ft.

54. For supporting the front ends of at least two parallel stacks of wheeled trailer frames of the detachable cargo type stacked horizontally with their tandem rear wheels nested, a row of at least two support racks according to claim 44, additionally comprising cross support means joining adjacent racks.

55. A row of support racks according to claim 54 wherein said cross support means joining adjacent racks comprises at least two horizontally spaced cross members joining said adjacent racks at points more than three feet above the base plane.

56. A row of support racks according to claim 53 wherein said at least two support racks additionally comprise support feet extending outwardly from said base normal to said parallel side members, and wherein said cross support means joining adjacent racks includes cross members joined to opposed feet of adjacent racks.

57. For lifting and transporting a wheeled trailer frame of the detachable cargo container type having a pair of longitudinally extending side rails having at least one downward facing surface by means of an overhead yard crane comprising a spreader frame having opposing side members, a lifting attachment comprising:
   a. at least one clamp jaw support means supported by said spreader frame and extending horizontally between said opposing side members; and
   b. rotatably and slidingly supported by each of said clamp jaw support means, a pair of opposed L-shaped clamp jaw members, at least one of said members being translatable toward the other to a closed position and away from the other to an open position for releasably clamping between them the side rails of said wheeled trailer frame, each L-shaped clamp jaw member having a horizontally extending section which, in said closed position, closely underlies a downward facing surface of one of said side rails, and each clamp jaw member being rotatable about 90 degrees to a stowed position.

58. A lifting attachment according to claim 57 wherein said at least one claim jaw support means is a single support means located in the middle of said spreader frame.

59. A lifting attachment according to claim 58 wherein each of said clamp jaw members is power operated and movable toward and away from the other.

60. A lifting attachment according to claim 58 additionally comprising a centering guide rotatably supported by said clamp jaw support means intermediate said clamp jaw members, said guide being rotable about 90 degrees to a stowed position.

61. A lifting attachment according to claim 58 wherein the side rails are I-beams having a lower downward facing surface and a height and wherein the horizontally extending section of each clamp jaw member, in said closed position, closely underlies said lower downward facing surface.

* * * * *